May 6, 1930. G. H. HUNT 1,756,979

BRAKE APPLYING MEANS

Filed July 16, 1927

INVENTOR
GEORGE H. HUNT
BY
M. W. McConkey
ATTORNEY

Patented May 6, 1930

1,756,979

UNITED STATES PATENT OFFICE

GEORGE H. HUNT, OF SOUTH BEND, INDIANA, ASSIGNOR TO BENDIX BRAKE COMPANY, OF CHICAGO, ILLINOIS, A CORPORATION OF ILLINOIS

BRAKE-APPLYING MEANS

Application filed July 16, 1927. Serial No. 206,162.

This invention relates to brakes and is illustrated as embodied in novel operating means for an automobile brake. An object of the invention is to provide simple and reliable means for adjusting the brake to compensate for wear and which preferably can be operated automatically.

In one desirable arrangement there are two shaft sections arranged end to end and provided with interlocking teeth, together with means for automatically shifting one section angularly with respect to the other to adjust for wear of the brake. Preferably one of the shaft sections is hollow and the applying device operated thereby has a part extending into the hollow shaft which is operated by the novel adjusting means, the adjusting means being shown in the drawing as partly housed within the hollow shaft.

Another feature of the invention relates to positioning an applying device such as a cam, by means of a radially extending arm engaging a stop which limits its movement. Preferably the stop engaged by the arm is shiftable, for example against frictional resistance, to set it for a predetermined release movement of the applying device so that its position is adjusted automatically as the brake wears.

The above and other objects and features of the invention, including various novel and desirable details of construction, will be apparent from the following description of one illustrative embodiment shown in the accompanying drawing, in which.

Figure 1:
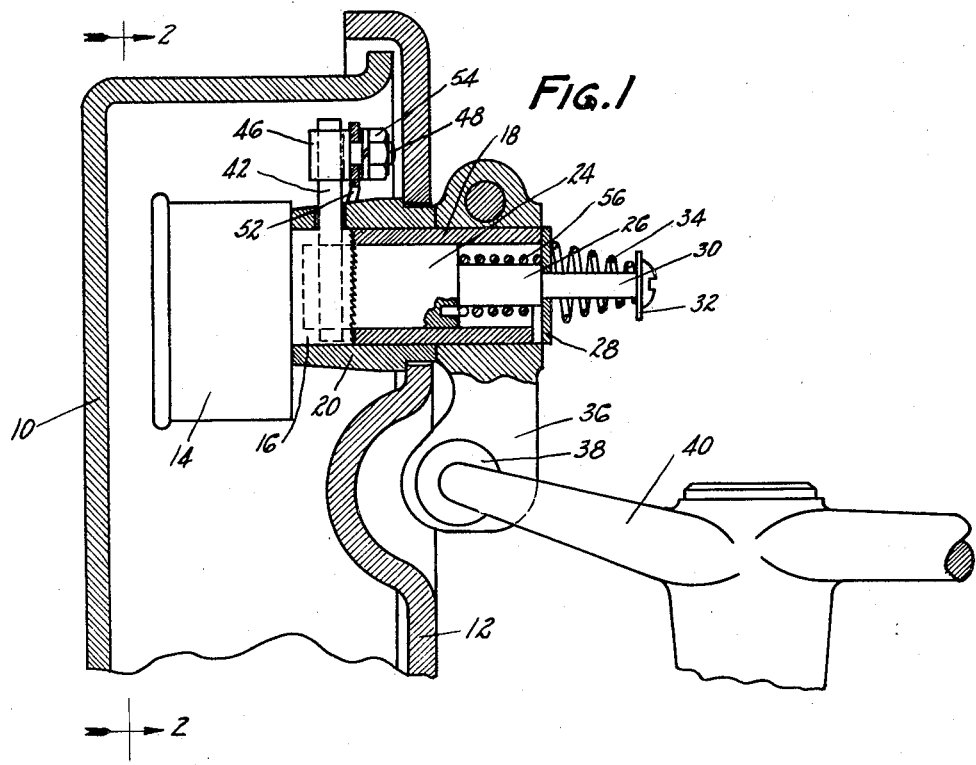
Figure 1 is a partial section through the upper part of the brake and showing most of the adjusting and applying means in rear elevation.
Figure 2:
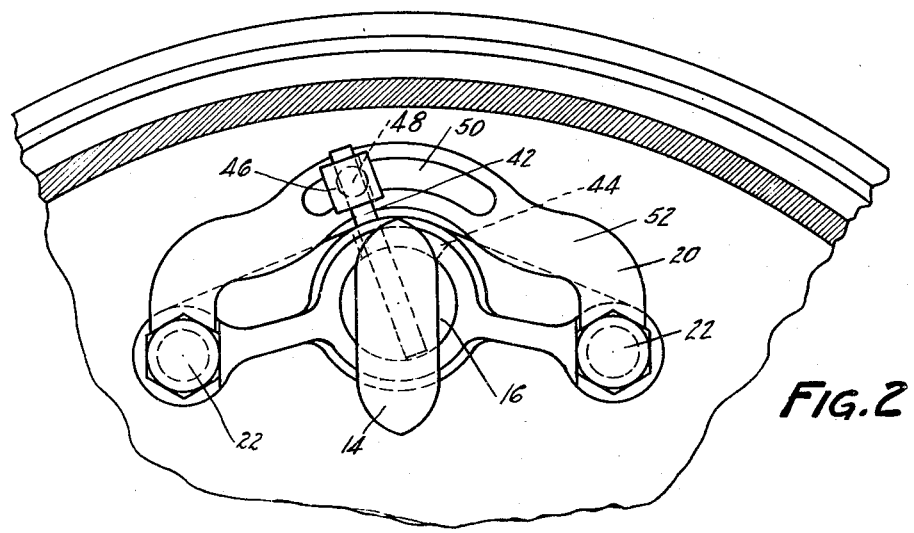
Figure 2 is a section on the line 2—2 of Figure 1 and showing the applying means in outside elevation.

The brake illustrated includes a rotatable drum 10, at the open side of which is a backing plate 12 and within which is arranged the friction means of the brake. Friction means of any desired character may be used, for example brake shoes shown and described in Patent No. 1,567,716, granted Bendix Brake Company on December 29, 1925, on application of A. Y. Dodge. The shoes or their equivalents are forced against the drum 10 to apply the brake by applying means such as a double cam 14.

The applying device 14 is formed with a short shaft section 16 having teeth interlocking with teeth on the end of a hollow shaft or sleeve 18 journalled in a bracket 20 secured by bolts 22 or the like to the backing plate 12. The applying device also has a part 24, which may be integral with the part 16 or may be a separate part secured thereto, and which projects into the interior of the hollow shaft 18. An extension 26 of this portion 24 is engaged by a washer 28, which washer also engages the end of the hollow shaft 18 when the teeth on shaft sections 16 and 18 are in interlocking engagement with each other. The portion 24 is further extended by a post 30, which may be a separate part threaded into the end of part 28 to compress a coil spring 34. It will be seen that the spring 34 holds the teeth on the shaft sections 16 and 18 yieldingly in interlocking engagement.

Means for rocking the hollow shaft 18 to apply the brake may include an arm 36 clamped on the end of the hollow shaft and engaged by an integral ball 38 on the end of a generally horizontal lever 40. When the brake is on a front wheel, I prefer to arrange these parts so that when the brake is applied the center of the ball 38 is in or immediately adjacent the swivelling axis of the wheel. The lever 40 may be fulcrumed on the axle or on a lateral extension of the king-pin of the wheel.

The shaft section 16 of the applying device is preferably provided with an arm 42 extending through a slot 44 in the bracket 20 and extending into an opening in a stop 46. The opening in the stop 46 is wider than the arm 42 in an amount equal to the desired angular movement of the arm 42 when the brake is released. The stop 46 has a stem 48 extending through an arcuate slot 50 in a stamping 52 held by the bolts 22. A clamp nut 54 threaded on the end of the stem 48 frictionally clamps the stop 46 to the stamping 52.

In the operation of the device described above, the application of the brake after it is worn causes the arm 42 to engage the opposite side of the opening in the stop 46 and to shift the stop 46 to a new position against the frictional resistance of the nut 54. Then, when the brake is released, the arm 42 again engages the initial side of the opening in the stop 46 after the predetermined angular release movement, and holds the cam 14 or its equivalent in a corresponding position such as to give the brake shoes a predetermined clearance with respect to the brake drum.

In order to insure the return of the hollow shaft section 18 and its arm 36 to their initial positions, in any adjusted position of the applying device 14, I prefer to provide a strong torsion spring 56 connected at one end to the portion 24 of the applying device and at its other end to the hollow shaft 18. When the applying device 14 is stopped in a new position to compensate for wear of the brake, the spring 56 will shift the hollow shaft 18 to bring it back to its initial position, whereupon the spring 34 will again force the teeth on the hollow shaft 18 into interlocking engagement with the teeth on the shaft sections 16.

While one illustrative embodiment has been described in detail, it is not my intention to limit the scope of the invention to that particular embodiment or otherwise than by the terms of the appended claims.

I claim:

1. Brake-applying means comprising, in combination, a hollow shaft arranged to be operated to apply the brake, an applying device operated by the hollow shaft and having a part extending into the hollow shaft, and means acting on said part for automatically causing relative turning movement of said device angularly with respect to the hollow shaft to compensate for wear of the brake.

2. Brake-applying means comprising, in combination, a hollow shaft arranged to be operated to apply the brake, an applying device operated by the hollow shaft and having a part extending into the hollow shaft, a stop, and a spring cooperating with the stop and acting on said part for automatically causing relative turning movement of said device angularly with respect to the hollow shaft to compensate for wear of the brake.

3. Brake-applying means comprising, in combination, a hollow shaft arranged to be operated to apply the brake, an applying device operated by the hollow shaft and having a part extending into the hollow shaft, and a torsion spring housed within the hollow shaft beyond said part and connected at one end to the shaft and at the other end to said part and urging the applying device and the shaft angularly in opposite directions to compensate for wear of the brake.

4. Brake-applying means comprising, in combination, a hollow shaft arranged to be operated to apply the brake, an applying device operated by the hollow shaft and having a part extending into the hollow shaft, a torsion spring housed within the hollow shaft beyond said part and connected at one end to the shaft and at the other end to said part and urging the applying device and the shaft angularly in opposite directions to compensate for wear of the brake, and a stop rendered effective by excessive brake wear to cause the spring to turn the applying device with respect to the shaft.

5. Brake-applying means comprising, in combination, an applying device, a hollow operating shaft for the applying device, the applying device and the shaft having interlocking ratchet teeth, and means extending through the hollow shaft for urging said teeth together, together with means for automatically causing relative turning movement of the applying device with respect to the shaft and then permitting the teeth to interlock again, to compensate for wear of the brake.

6. Brake-applying means comprising, in combination, an applying device, a hollow operating shaft for the applying device, the applying device and the shaft having interlocking ratchet teeth, a part connected to the applying device and extending through the hollow shaft and having at its end a stop beyond the hollow shaft, and a coil spring confined between said stop and the end of the hollow shaft, together with means for automatically causing relative turning movement of the applying device with respect to the shaft and then permitting the teeth to interlock again, to compensate for wear of the brake.

7. Brake-applying means comprising, in combination, an applying device, a hollow operating shaft for the applying device, the applying device and the shaft having interlocking ratchet teeth, and means extending through the hollow shaft for urging said teeth together, together with a torsion spring housed within the hollow shaft for causing relative turning movement of the applying device with respect to the shaft and then permitting the teeth to interlock again, to compensate for wear of the brakes.

8. Brake-applying means comprising, in combination, an applying device, a hollow operating shaft for the applying device, the applying device and the shaft having interlocking ratchet teeth, a part connected to the applying device and extending through the hollow shaft and having at its end a stop beyond the hollow shaft, and a coil spring confined between said stop and the end of the hollow shaft, together with a torsion spring housed within the hollow shaft for causing relative turning movement of the applying device with respect to the shaft and then permitting the teeth to interlock again, to compensate for wear of the brake.

9. Brake-applying means comprising, in combination, a bracket formed with a bearing having a slot in one side, an applying device having a part in said bearing and an arm extending radially through said slot, and a stop engageable with the arm to limit the movement of the applying device.

10. Brake-applying means comprising, in combination, an applying device having an arm extending radially, and a frictionally held stop engageable with the arm to limit the movement of the applying device, said stop being shiftable on the application of the brake and permitting only a predetermined release movement of the applying device.

11. Brake-applying means comprising, in combination, an applying device having an arm extending radially, a stop having an opening embracing said arm and permitting it to have a predetermined free angular movement, and a mounting for the stop permitting the arm to shift the stop in case of excessive wear of the brake.

12. Brake-applying means comprising, in combination, an applying device having an arm extending radially, a stop having an opening embracing said arm and permitting it to have a predetermined free angular movement, and means frictionally resisting shifting of the stop.

In testimony whereof, I have hereunto signed my name.

GEORGE H. HUNT.